US009450936B2

United States Patent
Chan et al.

(10) Patent No.: US 9,450,936 B2
(45) Date of Patent: Sep. 20, 2016

(54) METHOD OF PROCESSING REQUESTS FOR DIGITAL SERVICES

(71) Applicant: Silverlake Mobility Ecosystem Sdn Bhd, Petaling Jaya, Selangor (MY)

(72) Inventors: Tong Yap Chan, Selangor (MY); Chi Long Yeong, Selangor (MY)

(73) Assignee: SILVERLAKE MOBILITY ECOSYSTEM SDN BHD, Petaling Jaya (MY)

( * ) Notice: Subject to any disclaimer, the term of this patent is extended or adjusted under 35 U.S.C. 154(b) by 0 days.

(21) Appl. No.: 14/435,573

(22) PCT Filed: Nov. 2, 2012

(86) PCT No.: PCT/MY2012/000268
§ 371 (c)(1),
(2) Date: Apr. 14, 2015

(87) PCT Pub. No.: WO2014/069978
PCT Pub. Date: May 8, 2014

(65) Prior Publication Data
US 2015/0288671 A1     Oct. 8, 2015

(51) Int. Cl.
*G06F 21/22*     (2006.01)
*H04L 29/06*     (2006.01)
(Continued)

(52) U.S. Cl.
CPC .......... *H04L 63/08* (2013.01); *H04L 63/0227* (2013.01); *H04L 63/102* (2013.01);
(Continued)

(58) Field of Classification Search
CPC ... H04L 63/08; H04L 29/08; H04L 63/0227; H04L 63/102; H04L 63/168; H04L 63/20; H04L 63/105; H04L 63/22; H04W 12/08; H04W 4/003; G06F 9/00; G06Q 10/00
See application file for complete search history.

(56) References Cited

U.S. PATENT DOCUMENTS 7,137,008 B1 * 11/2006 Hamid ............... G06F 21/31
                                                          713/182
7,631,193 B1 * 12/2009 Hoffman ............ G06F 21/32
                                                          382/115

(Continued)

FOREIGN PATENT DOCUMENTS

WO     WO 03/091895     11/2003 ............ G06F 15/16

OTHER PUBLICATIONS

International Search Report from corresponding International Patent Application No. PCT/MY2012/000268, dated May 17, 2013.

(Continued)

*Primary Examiner* — Taghi Arani
*Assistant Examiner* — Sharon Lynch
(74) *Attorney, Agent, or Firm* — Pearne & Gordon LLP

(57) ABSTRACT

A method of processing requests for different digital services hosted by respective service entities is disclosed. The method including steps of receiving a request packet from a communication device, the request packet includes source and destination identifiers, determining which one of the different digital services the communication device is requesting a service, based on the destination identifier, authenticating the request packet based on the source identifier to determine an access permission of the communication device for accessing the determined digital service, and if the access permission is granted, modifying the request packet and forwarding the modified request packet based on the destination identifier to the determined digital service for processing.

14 Claims, 11 Drawing Sheets

(51) Int. Cl.
*H04W 12/08* (2009.01)
*H04L 29/08* (2006.01)
*H04W 4/18* (2009.01)
*G06F 9/00* (2006.01)
*G06Q 10/00* (2012.01)
*H04W 4/00* (2009.01)

(52) U.S. Cl.
CPC ......... *H04L63/168* (2013.01); *H04L 67/2838* (2013.01); *H04W 4/18* (2013.01); *H04W 12/08* (2013.01); *G06F 9/00* (2013.01); *G06Q 10/00* (2013.01); *H04L 63/0815* (2013.01); *H04L 63/20* (2013.01); *H04L 69/22* (2013.01); *H04W 4/003* (2013.01)

(56) References Cited

U.S. PATENT DOCUMENTS

| | | | | |
|---|---|---|---|---|
| 7,865,937 B1* | 1/2011 | White | ................ | G06Q 20/3674 705/67 |
| 7,908,645 B2* | 3/2011 | Varghese | ............ | G06Q 20/341 715/773 |
| 8,495,714 B2* | 7/2013 | Jones | ................ | H04W 12/06 709/203 |
| 8,504,831 B2* | 8/2013 | Pratt | ................ | G06F 21/40 713/150 |
| 8,555,355 B2* | 10/2013 | Rathbun | ............ | H04L 9/3213 726/11 |
| 8,806,591 B2* | 8/2014 | Dallas | ................ | G06F 21/46 726/22 |
| 8,818,906 B1* | 8/2014 | Szwalbenest | ....... | H04L 63/0876 705/64 |
| 9,160,546 B2* | 10/2015 | Sorek | ................ | G06Q 20/4016 |
| 2002/0087894 A1* | 7/2002 | Foley | ................ | H04L 63/083 726/4 |
| 2004/0215980 A1* | 10/2004 | Hamid | ................ | G06F 21/6218 726/28 |
| 2005/0055578 A1* | 3/2005 | Wright | ................ | G06F 21/32 726/4 |
| 2005/0097320 A1* | 5/2005 | Golan | ................ | G06F 21/40 713/166 |
| 2006/0235973 A1 | 10/2006 | McBride et al. | ............. | 709/226 |
| 2006/0282660 A1* | 12/2006 | Varghese | ................ | G06Q 20/341 713/155 |
| 2007/0005766 A1 | 1/2007 | Singhal et al. | ................ | 709/225 |
| 2008/0040281 A1* | 2/2008 | Chakraborty | .......... | G06Q 30/08 705/52 |
| 2008/0046965 A1* | 2/2008 | Wright | ................ | G06F 21/32 726/1 |
| 2008/0052395 A1* | 2/2008 | Wright | ................ | H04L 63/20 709/224 |
| 2009/0089869 A1* | 4/2009 | Varghese | ................ | G06F 21/31 726/7 |
| 2010/0115113 A1 | 5/2010 | Short et al. | .................... | 709/228 |
| 2011/0225625 A1* | 9/2011 | Wolfson | ................ | H04L 63/08 726/1 |
| 2012/0303641 A1* | 11/2012 | Gudlavenkata-siva | ..................... | G06F 11/0709 707/755 |

OTHER PUBLICATIONS

International Preliminary Report on Patentability from corresponding International Patent Application No. PCT/MY2012/000268, dated Feb. 18, 2015.

\* cited by examiner

METHOD OF PROCESSING REQUESTS FOR DIGITAL SERVICES

FIELD

The present invention relates to a method of processing requests for digital services and related middleware system.

BACKGROUND

Due to proliferation of mobile devices 102, more related digital services have been introduced by service entities (or providers) to take advantage of the growing commercial opportunities available. An example scenario is depicted in FIG. 1, where the mobile devices 102 access the digital services provided by backend servers 104 of the service entities. However, it is getting increasingly difficult for users of the mobile devices 102 to keep track of the available digital services due to an explosive range of those services being introduced everyday, and also equally challenging for the service entities to timely provide the right sort of digital services demanded by the users in view of the above development.

One object of the present invention is thus to address at least one of the problems of the prior art and/or to provide a choice that is useful in the art.

SUMMARY

According to a $1^{st}$ aspect of the invention, there is provided a method of processing requests for different digital services hosted by respective service entities. The method comprises receiving a request packet from a communication device, the request packet includes source and destination identifiers, determining which one of the different digital services the communication device is requesting a service, based on the destination identifier, authenticating the request packet based on the source identifier to determine an access permission of the communication device for accessing the determined digital service, and if the access permission is granted, modifying the request packet and forwarding the modified request packet based on the destination identifier to the determined digital service for processing.

Usage of the proposed method advantageously enables elimination of complex, lengthy and costly point-to-point implementations. Additionally, the method allows implementation of a common interface that is utilisable by diverse mobile applications to communicate with a diverse range of server systems. Thus, new mobility application services can be rolled out faster to consumers for their usage benefit. In other words, the method allows implementation of a unified gateway system that will simplify and accelerate introduction of mobility application services to the consumers.

Preferably, the communication device may be a mobile communication device or a wired communication device. Also, the method may further comprise generating an error code, if the access permission is not granted, and forwarding an error packet, which includes the error code, to the communication device. Yet preferably, the method may further comprise retrieving device profile information from the communication device.

Additionally, the method may preferably further comprise retrieving information corresponding to a location of the communication device from the communication device. Moreover, the method may also further comprise logging information associated with processing of the request packet. More preferably, the method may further comprise receiving a response packet from a system associated to the destination identifier, in response to the forwarded request packet, processing the response packet to extract associated data information, and forwarding the extracted data information to the communication device. Processing the response packet may include performing corresponding steps for analysing the extracted data information. Preferably, the corresponding steps may be selected from a group consisting of logging an error message and sending an associated error packet if the extracted data information includes the error message, and logging a success message and sending an associated success packet if the extracted data information includes the success message. Yet further, the service entities may provide the different digital services selecting from a group comprising finance, logistic, retail, media, healthcare, infotainment, security, education, and tourism.

According to a $2^{nd}$ aspect of the invention, there is provided a processor for processing requests for different digital services hosted by respective service entities. The processor comprises an aggregator module for receiving a request packet from a communication device, the request packet includes source and destination identifiers and for determining which one of the different digital services the communication device is requesting a service, based on the destination identifier, and an authentication module for authenticating the request packet based on the source identifier to determine an access permission of the communication device for accessing the determined digital service. If the access permission is granted, the aggregator module modifies the request packet and forwards the modified request packet based on the destination identifier to the determined digital service for processing.

Preferably, the aggregator module may include a provisioning sub module configured to apply access mapping rules to determine the access permission of the communication device. Yet additionally, the aggregator module may also include an identity and access sub module configured to perform identity management of the communication device, wherein identity management includes providing authentication, authorisation and accounting. Moreover, the aggregator module may preferably include a transaction logging sub module configured to log information relating to the request packet received by the aggregator module.

According to a $3^{rd}$ aspect of the invention, there is provided a middleware system for enabling digital transactions between communication devices and server systems, the middleware system comprising the processor of the $2^{nd}$ aspect of the invention.

It should be apparent that features relating to one aspect of the invention may also be applicable to the other aspects of the invention.

These and other aspects of the invention will be apparent from and elucidated with reference to the embodiments described hereinafter.

BRIEF DESCRIPTION OF THE DRAWINGS

Embodiments of the invention are disclosed hereinafter with reference to the accompanying drawings, in which:

FIG. 5 is a schematic diagram of a core engine component depicted in the system of FIG. 4a;

DETAILED DESCRIPTION OF PREFERRED EMBODIMENTS

Figure 1:
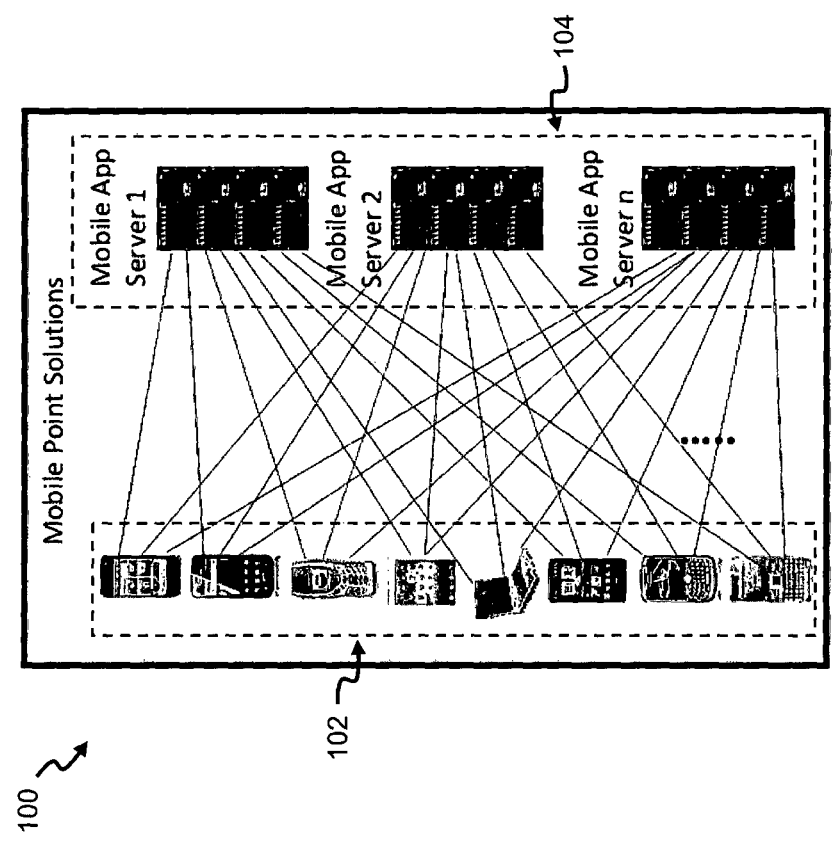
FIG. 1 shows an implementation of a point-to-point solution, according to the prior art.
Figure 2:
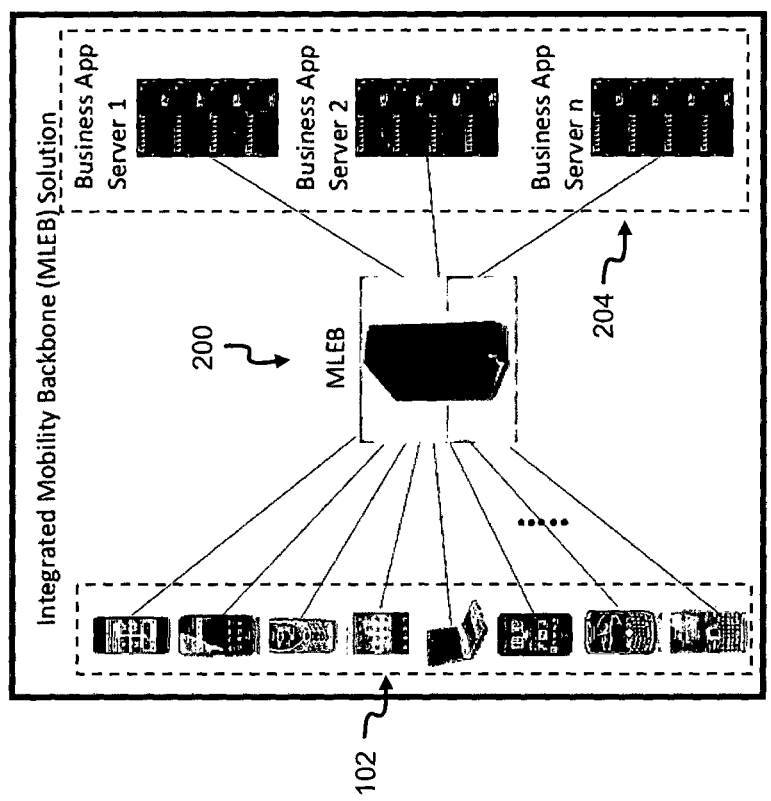
FIG. 2 shows a middleware system according to an embodiment of the invention.
Figure 3:
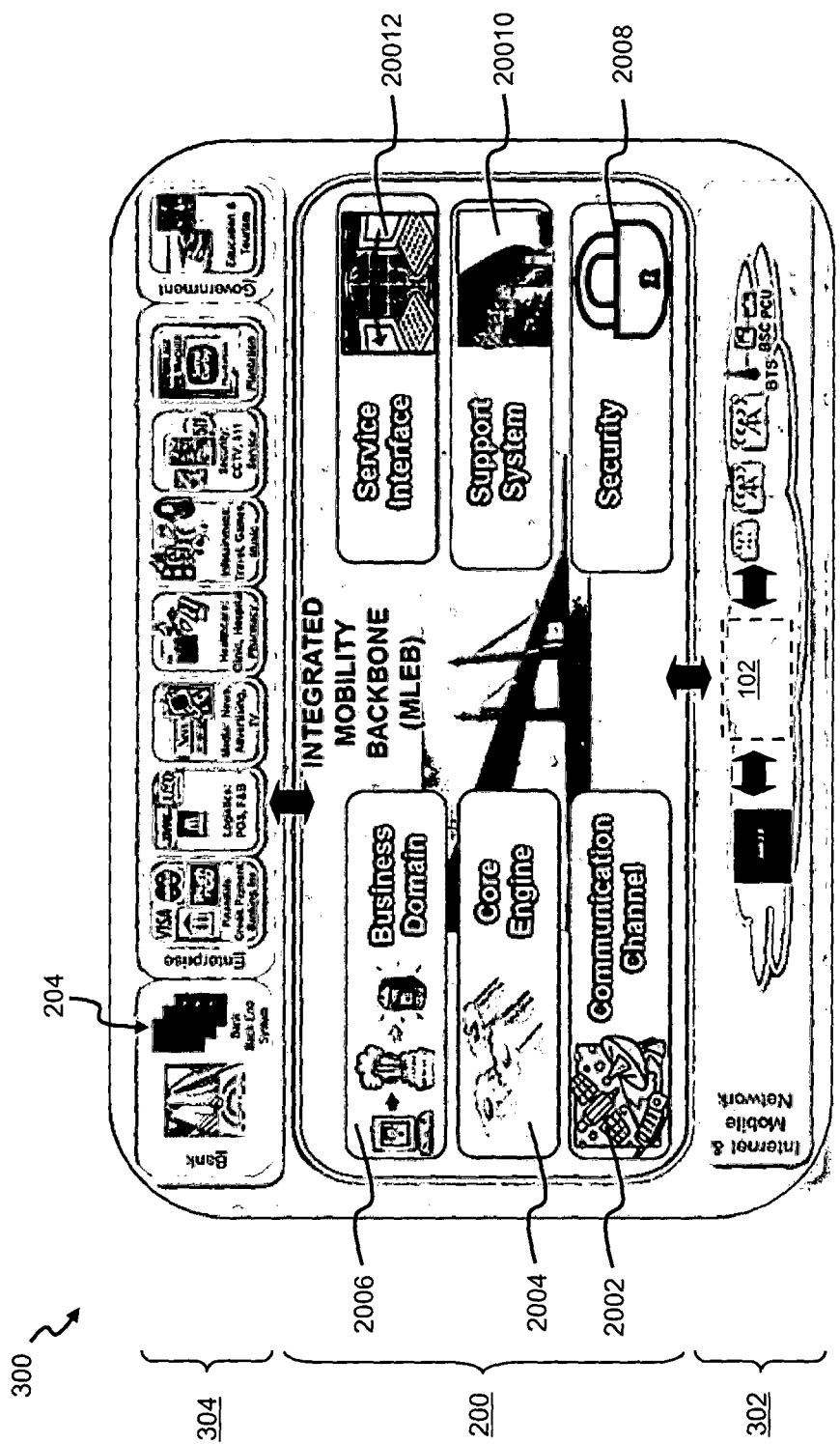
FIG. 3 illustrates a service framework of the system of FIG. 2.

FIG. 2 shows a middleware system 200 (hereinafter system) according to an embodiment of the invention, and FIG. 3 illustrates a corresponding service framework 300 of the system 200. The system 200 is also termed as the integrated mobility backbone (MLEB). Specifically, the system 200 is an Internet-based integrated mobility command-and-control platform which acts as an intermediate gateway for interconnecting and bridging mobile applications installed on the mobile devices 102, which includes IP-based (e.g. smartphones, laptops, tablets and the like) and non-IP based devices (e.g. 2G phones and the like) to corresponding backend application servers 204 that provide mobile web and native application services through those mobile applications. It is to be understood that mobile web and native application services also include digital services that may not necessarily require the use of web in order to effect the required transactions. Mobile web and native application services also further include related web-based content providing services. As may be appreciated, the mobile web and native application services enable transactions to be performed and information/data to be shared between users of the mobile devices 102 and the backend application servers 204. The backend application servers 204 include enterprise backend systems such as those administered by financial institutions (e.g. banks or stock exchanges), business enterprises, government entities, Internet providers, and the like.

The system 200 is conceptualised as a service framework 300 shown in FIG. 3, which comprises three tier levels having a mobile network 302 as the bottom tier level, to the system 200 being structured as the intermediate tier level, and enterprises 304 forming the top tier level. The mobile network 302 provides the necessary communication radio links/infrastructure to enable the mobile devices 102 to connect to the enterprises 304 via the system 200.

It is to be appreciated that the enterprises 304 are entities responsible for administering the respective backend application servers 204 depicted in FIG. 2. The enterprises 304 are thus providers of the mobile web and native application services accessible by the users of the mobile devices 102; in other words, the enterprises 304 (together with the backend application servers 204) are also termed as service entities, as will be apparent. As aforementioned, the enterprises 304 include institutions in business areas such as finance (e.g. banks providing payment, clearing settlement, banking services or the like), logistic, retail, media, healthcare, infotainment and security. The enterprises 304 also further include government entities providing services such as education, tourism or the like.

As shown in FIG. 3, the system 200 serve as a bridge between the mobile devices 102 in the mobile network 302 to the backend application servers 204 of the enterprises 304, to enable transactions to be executed, and information/data to be shared between the users of the mobile devices 102 and enterprises 304.

Figure 4A:
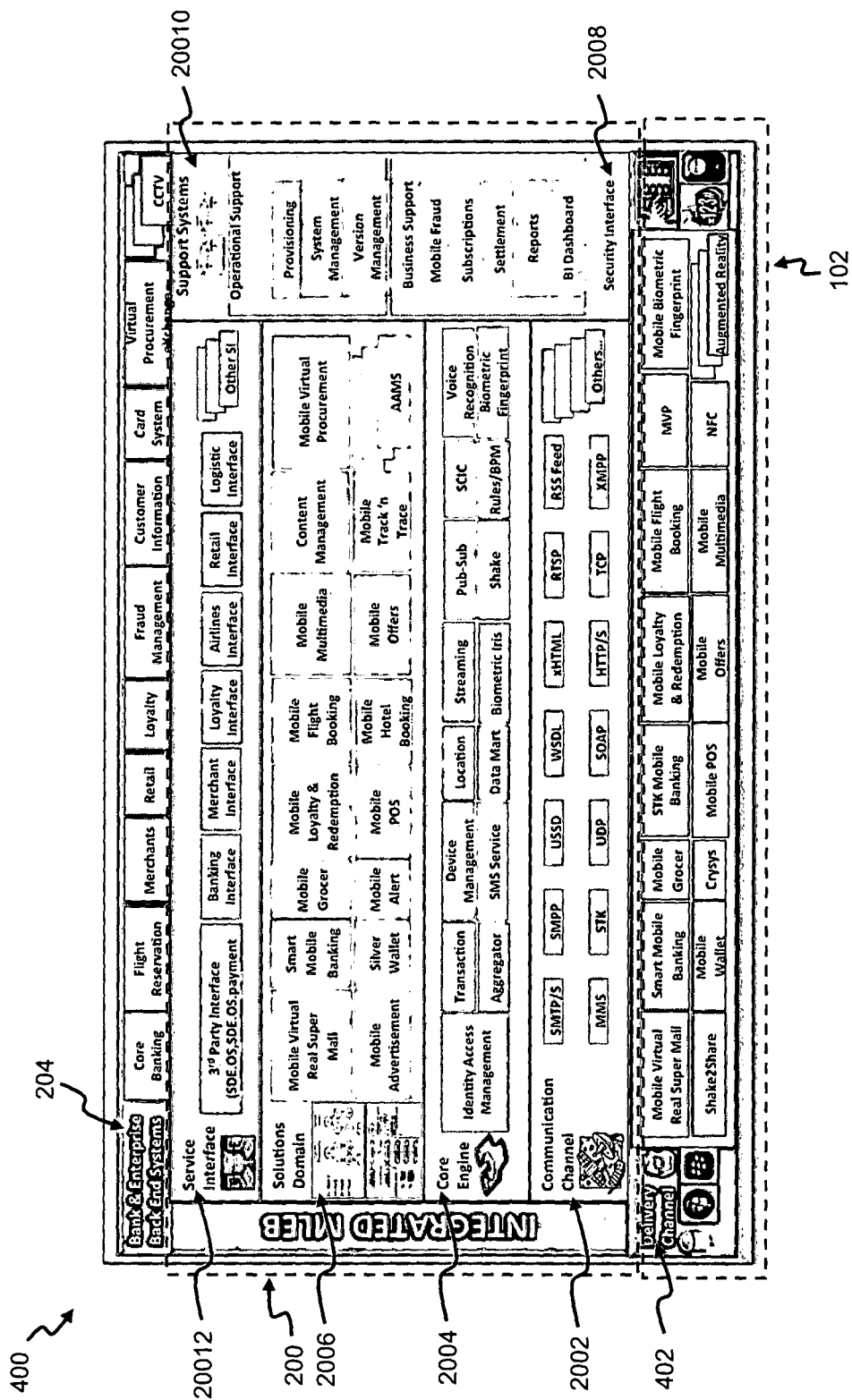
FIG. 4a depicts a collective intelligence framework of the system of FIG. 2.
Figure 4B:
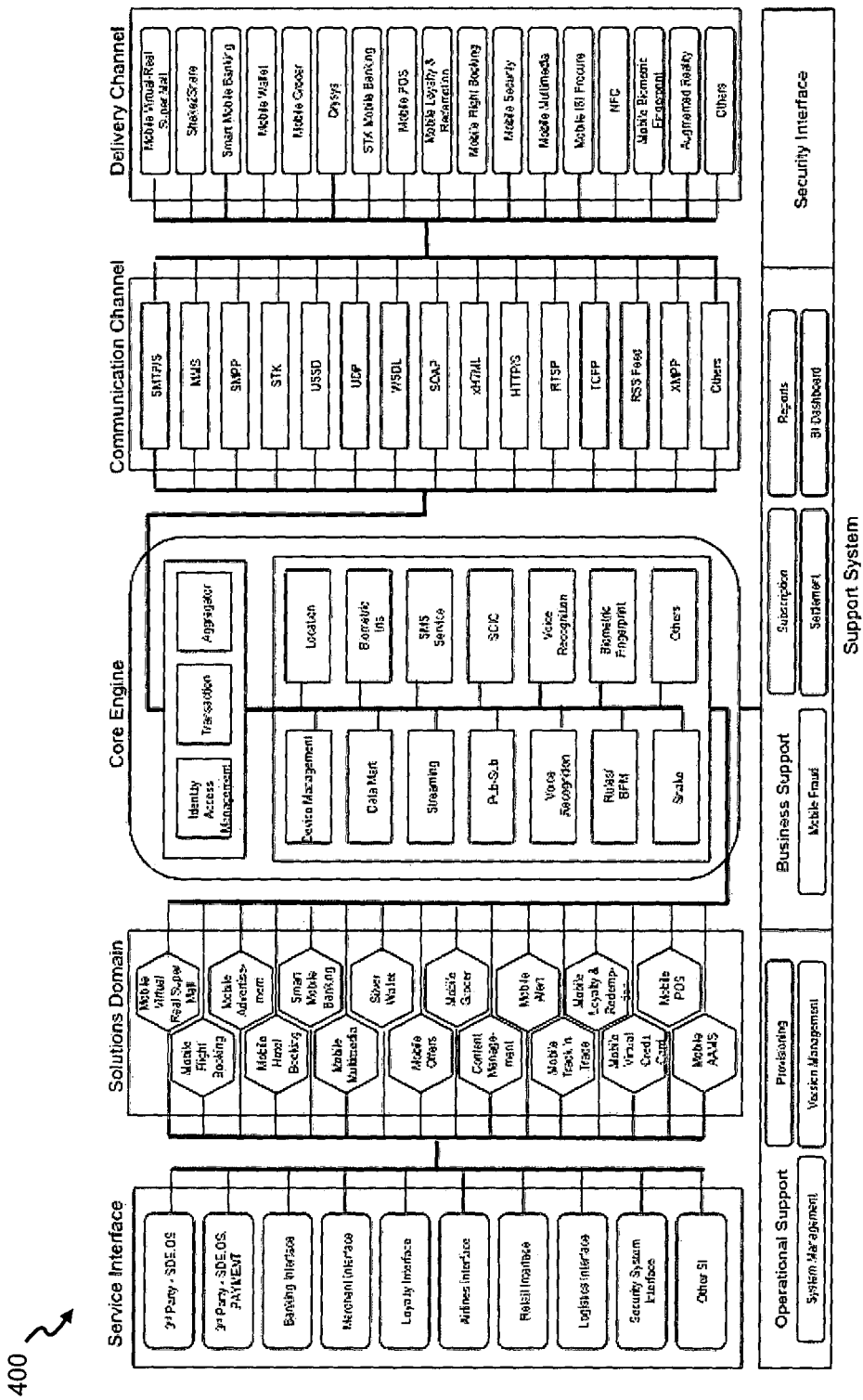
FIG. 4b depicts an alternative representation of the collective intelligence framework of FIG. 2.

The system 200 is structured into different components, each of which will be described further with reference to a collective intelligence framework 400 of the system 200 as illustrated in FIG. 4a. An alternative representation of the collective intelligence framework 400 is shown in FIG. 4b. The collective intelligence framework 400 specifically includes software components that are necessary for the proper functioning of the system 200. Particularly, the components of the system 200 are respectively a communication channel (CC) component 2002, a core engine (CE) component 2004, a solutions domain (SD) component 2006 (which is also termed as business domain component), a security interface component 2008, a support system component 20010, and a service interface component 20012. For sake of brevity, use of the term "component" for the respective components will be omitted in subsequent description. The collective intelligence framework 400 of the system 200 also includes further delivery channels 402 and the backend application servers 204 of the enterprises 304.

The delivery channels 402 are means through which mobile web and native application services are delivered to users of the mobile devices 102, and specifically, the means are the mobile (or native) applications installed in the mobile devices 102. The mobile devices 102 are installed with operating systems that may include Apple iOS™, Google Android™, BlackBerry OS™, Windows Mobile™, Symbian OS™, or the like. It is therefore apparent that the mobile (or native) applications on the mobile devices 102 are configured to be executable on the respective installed operating systems of the mobile devices 102. As afore described, the backend application servers 204 provide mobile web and native application services to the users of the mobile devices 102. Accordingly, the system 200 is configured to aggregate those services, and subsequently provide the aggregated services to the users of the mobile devices 102 via the delivery channels 402.

The communication channel 2002 enables the system 200 to communicate with the mobile network 302 to deliver the mobile web and native application services to the users of the mobile devices 102. Specifically, the communication channel 2002 includes interfaces (implemented as software sub-modules) to enable the system 200 to interact with the mobile network 302 via various communication channels/protocol stacks/network elements such as SMPP, STK, USSD, RTSP, XHTML, WSDL or the like, as will be apparent to skilled persons. Furthermore, the communication channel 2002 is configured with a sub-layer through which the system 200 is able to communicate with the backend application servers 204. The sub-layer includes interfaces such as TCP, SOAP, XMPP, SMTP/S or the like. It is to be appreciated that the interfaces in the communication channel 2002 are updateable as required (e.g. when existing protocols are refreshed to newer versions, or new protocols become available due to new development of related mobile and internet technologies).

The core engine 2004 is configured to provide main functionalities/services offered by the system 200. In this respect, the core engine 2004 handles user and session management for all other components 2002, 2006, 2008, 20010, 20012 of the system 200. Specifically, the functionalities/services provided by the core engine 2004 include, but not limited to, identity-and-access-management (IAM), transaction, aggregator, device management, SMS service, location, data mart, streaming, biometric authentication (e.g. using iris or fingerprint), voice recognition, rules/BPM provision, secured payment (e.g. shake) and the like. It is also to be appreciated that new functionalities/services can be added to the core engine 2004 as necessary from time-to-time, based on specific requirements. Each functionality/service is provided through a software sub module installed within the core engine 2004.

Brief descriptions of the provided services are given hereinafter. All incoming requests received by the system 200 are processed using a centralised IAM framework devised for handling authentication, authorisation, and accounting purposes, whereas in respect of transactions logging, all transactions going through the system 200 are logged to allow easy retrieval and consolidation of the corresponding information when needed; that is, procedures are devised for generating logs/reports that are time-stamped to meet non-repudiation standards. For device management, the system 200 identifies the mobile devices 102 by their respective identities, which primarily involves matching the ID field of an incoming request to a device profile database of the system 200. Device management also includes determining and managing device locations, in which the system 200 obtains location data of the mobile devices 102 initiating the requests. The location data include GPS data (i.e. longitude, latitude, and altitude), cellular-ID, IP geo-location and the like. In particular, for IP-based mobile devices 102, the location data include GPS data, whereas for non-IP-based mobile devices 102, the location data includes only cellular-ID since GPS data are not readily available.

The aggregator then consolidates the mobile web and native application services provided by the enterprises 304 for providing them to the mobile devices 102, as well as handles the monitoring and control of the system 200. As for secured payment, the system 200 allows the use of any suitable payment protocol in this respect, such as the "Shake" protocol devised by Silverlake Mobility Eco System Sdn. Bhd of Malaysia, which enables secured payment, and exchange of data/information/documents between the mobile devices 102, based on corresponding pairing algorithms pre-installed on the mobile devices 102 and backend application servers 204. In relation to biometric authentication, the system 200 implements fingerprint recognition and iris authentication methods to uniquely ascertain the identities of the users of the mobile devices 204, so that users who are not granted permissions to access certain services offered by the service entities are denied access accordingly. Lastly, the data mart is used to store all received raw data, such as location data, originating countries, gender information and the like. The received raw data are subsequently used for data and information analytics purposes.

The solutions domain (or known as business domain otherwise) 2006 is configured to include business logic and processes which provide the type of the mobile web/digital and native application services offered by the enterprises 304 as desired by the users. More specifically, the solutions domain 2006 comprises a plurality of software sub-modules, each configured to handle the corresponding business logic and processes. Furthermore, each sub-module also has an equivalent front-end mobile application at the level of the delivery channels 402, which is configured to retrieve relevant product/services information from the backend application servers 204 to be presented to the users. It is to be understood that new sub-modules may be added to the solutions domain 2006 as necessary to include new business logic and processes; in other words, the configuration of the solutions domain 2006 evolves as required.

Figure 4C:
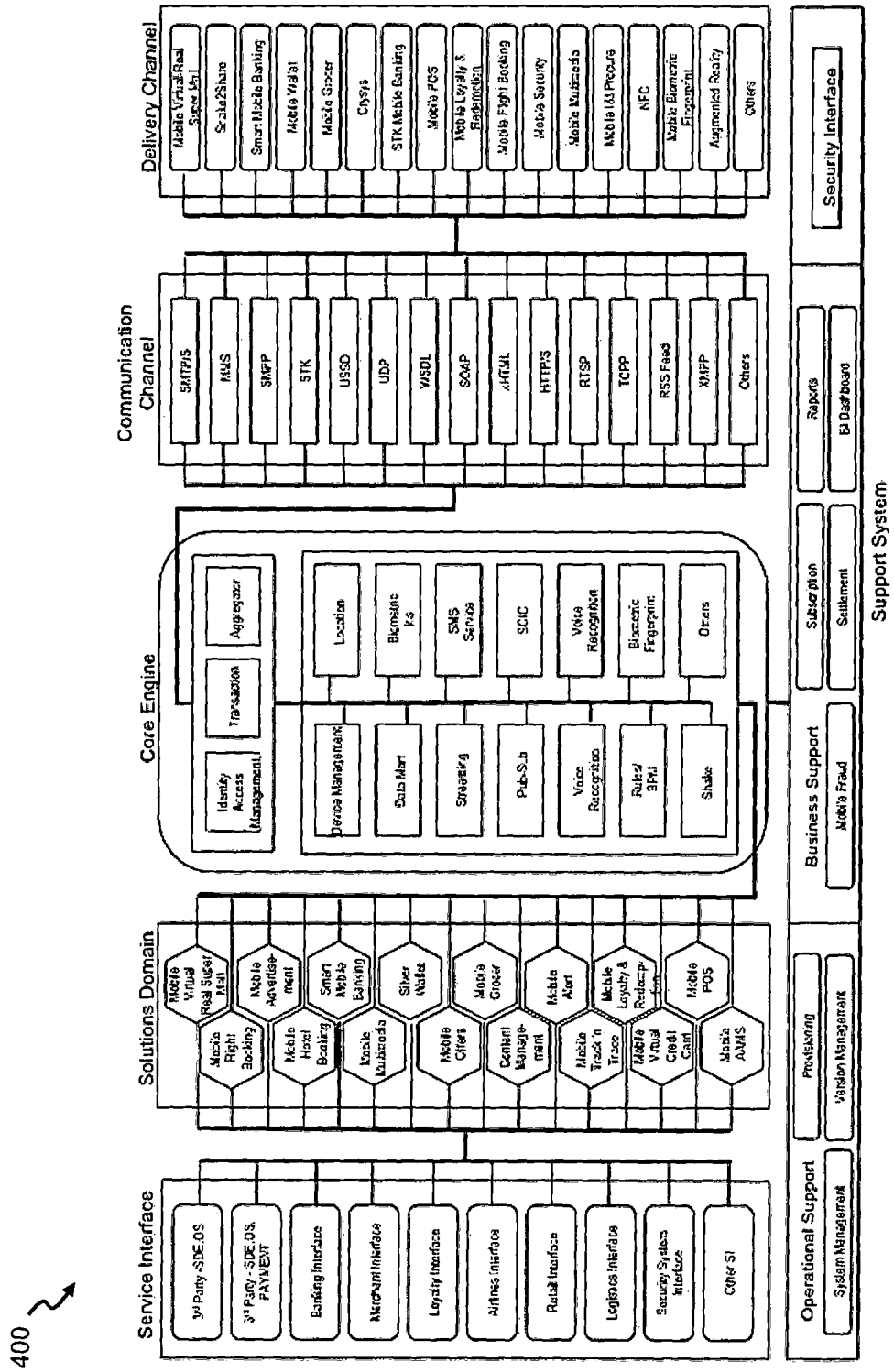
FIG. 4c depicts respective components used in the collective intelligence framework of FIG. 2 for an example relating to the virtual-real super mall service.
Figure 4D:
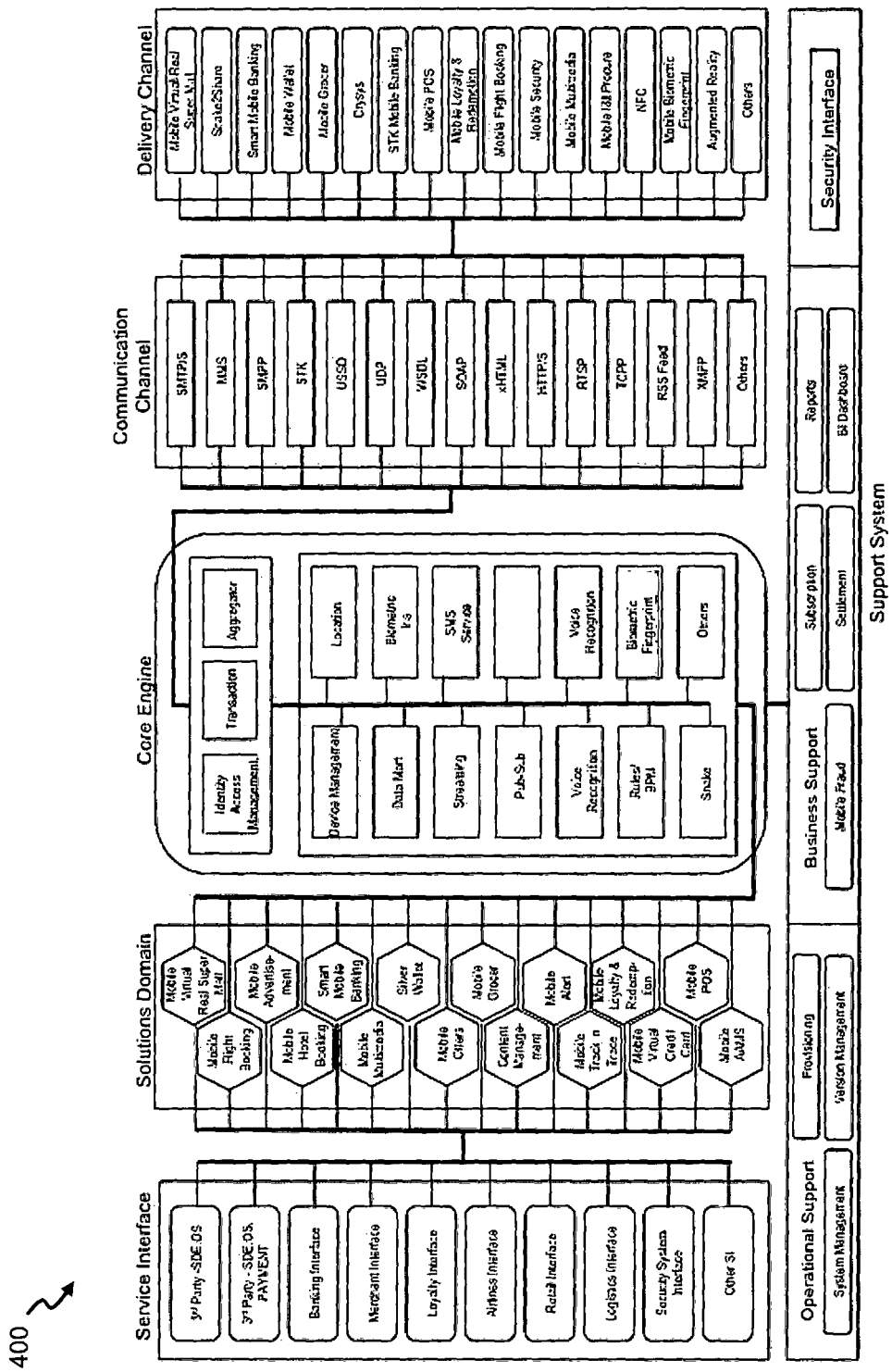
FIG. 4d depicts respective components used in the collective intelligence framework of FIG. 2 for an example relating to the smart mobile banking service.

In addition, the solutions domain 2006 includes the following services (which are provided by the respective sub modules): virtual-real super mall, smart mobile banking, mobile advertising, mobile wallet, mobile loyalty and redemption, mobile flight and hotel booking, content management and others. Particularly, these services offered by the solutions domain 2006 are the ones desired by the users. The virtual-real super mall service offers a wide range of product and services to the users of the mobile devices 102 (i.e. shoppers), whereas the smart mobile domain knowledge provides services in relation to financial (e.g. mobile banking) and non-financial industries (e.g. insurance offerings, movie booking and the like). For purpose of illustration, FIGS. 4c and 4d depict the associated highlighted components used in the collective intelligence framework 400 of the system 200 relating to the virtual-real super mall service, and smart mobile banking service respectively. It is therefore to be understood that other services will accordingly use different components in the collective intelligence framework 400.

The mobile advertising and alert service provides a mobile channel that allows the enterprises 304 to subscribe to mobile advertising, and the system 200 is configured to send SMS alerts/notifications for purposes such as fraud reporting or marketing campaign. The mobile wallet service then provides secure payment services utilising cashless, cardless and contactless delivery mechanisms such as NFC or the aforementioned "Shake" protocol. The mobile wallet is configured as prepaid stored value or online postpaid. On the other hand, the mobile offers and loyalty service enables the users of the mobile devices 102 to access e-coupons for monetary offers/discounts, and to redeem merchant points used for shopping. The travel and tourism service allows the users of the mobile devices 102 who wish to do travelling make flights/accommodation bookings, while the content management service enables the users of the mobile devices 102 to publish, edit and modify contents (e.g. catalogue information, product information, promotions and the equivalent).

In respect of the service interface 20012, it includes third party interfaces (e.g. the SDE.OS and SDE.OS payment services). Particularly, the service interface 20012 interfaces with the backend application servers 204 to offer services such as core banking for mobile banking, loyalty scheme for merchant points redemption, fraud detection for fraud reporting, retailing for product and services offering, and etc. On the other hand, the service interface 20012 also interfaces with the associated backend application servers 204 to provide core banking and card payment services. Therefore, through the service interface 20012 (which functions to convert data into formats suitable to be used by different backend w application servers 204), enterprises for example those in logistics, airlifies, travel, tourism, media, security, and the like are able to offer their services to the users of the mobile devices 102.

The support system 20010 includes the necessary is provisioning/management/operational support business systems or back office for purposes of monitoring and reporting.

Additionally, the system 200 also provides the security interface 2008 (e.g. encryption and security hardening) for the mobile devices 102 through to the backend application servers 204 in order to ascertain the necessary access rights of the mobile devices 102 requesting access. Specifically, the security interface 2008 is configured to handle aspects of mobile internet security with regard to security mechanisms such as injection flaws, cross site scripting (XSS), broken authentication, session management, and the like. Moreover, the security interface 2008 also implements, at the level of the delivery channels 402, other aspects of mobile security for the mobile devices 102 such as never-save-sensitive, randomizing PIN digits, jailbreak detection, and the like.

Figure 5:
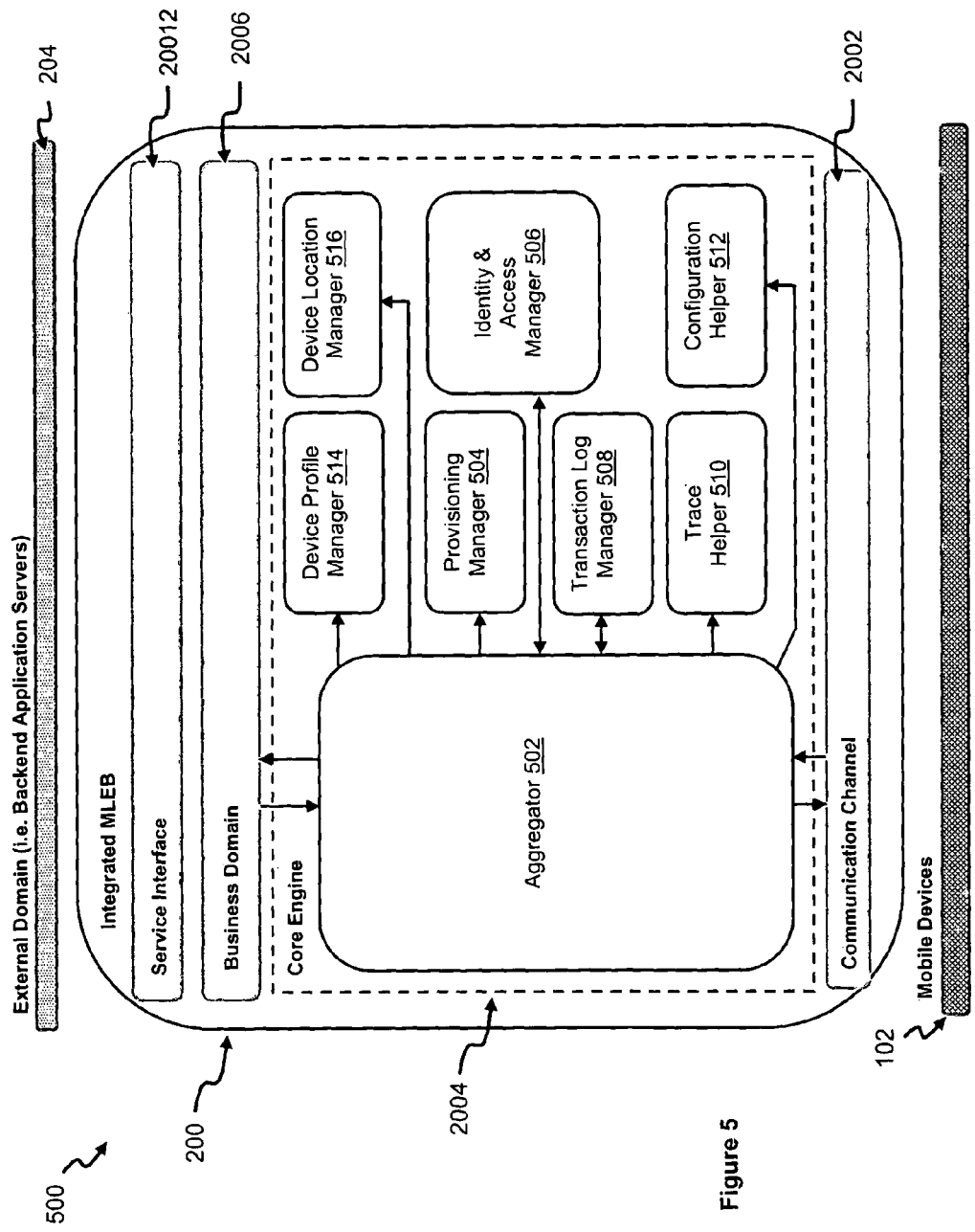

FIG. 5 accordingly shows a schematic diagram 500 of the core engine 2004 of the system 200. The core engine 2004 primarily comprises an aggregator 502, in which other modules including a provisioning manager 504, an identity and access manager 506, a transaction log manager 508, a trace helper 510, a configuration helper 512, a device profile manager 514, and a location manager 516 are communicably coupled to. It is to be appreciated that the provisioning manager 504, identity and access manager 506, transaction log manager 508, device profile manager 514, and device location manager 516 are also collectively termed as manager modules.

The aggregator 502 serves as a centralised clearing house for coordinating/directing incoming requests and outgoing responses between the solutions domain 2006 and communication channel 2002 of the system 200. Importantly, the aggregator 502 ensures control and consistency of operations by requiring all requests/responses to be subjected to a same set of processing checks, which are provided by the manager modules 504, 506, 508, 510, 512, 514, 516. Further, any system requests communicated between the manager modules 504, 506, 508, 510, 512, 514, 516 are also routed through the aggregator 502.

The aggregator 502 also provides specialised functions with regard to handling of user management for the following activities type: (i) starting sessions for anonymous users, (ii) logging in user for registered users, (iiii) registering new users, (iv) updating details of users, and (v) retrieving records of users.

In terms of configuration, the aggregator 502 is arranged to actively listen in the background for receiving requests transmitted from the solutions domain 2006 or communication channel 2002. It is to be highlighted that requests from either the solutions domain 2006 or communication channel 2002 are accorded equal treatment by the aggregator 502; in other words, requests are processed based on the order received, with no preferential treatment. It will also be apparent that requests (received via the communication channel 2002) to the backend application servers 204 are generated on initiation by the users of the mobile devices 102 for transactions to be executed. It is to be appreciated that a transaction includes only a single request or multiple sequential requests. Requests received by the aggregator 502 are thereafter accordingly forwarded to the appropriate software sub-modules of the communication channel 2002 or solutions domain 2006 to be processed. Additionally, requests are uniquely identified by the aggregator 502 from client codes included in the corresponding requests.

Requests are classified into two types: (i) an original request, and (ii) a follow-up request. It will be apparent that the requests are formatted in the form of digitised packets for transmission. An original request is one that commences a desired transaction, and includes the following object fields: a transaction header, a request header, and a body portion. The transaction header comprises information on the transaction, client code, and session-ID. The client code is associated to a session-ID which is timed to expire after a predetermined period (e.g. twenty seconds). The request header comprises information about the request, including a requesting source (i.e. the mobile device 102 operated by the user) and a requested destination, while the body portion includes request data to be forwarded to the requested destination for further processing.

A follow-up request is a subsequent request that follows from an earlier original request, and includes the following object fields: an aggregator header, a request header, and a body portion. Specifically, the aggregator header includes information about the earlier transaction received from the aggregator 502, based on processing of the original request. The request header, which comprises information about the request, includes a requesting source and a requested destination, whereas the body portion comprises request data to be forwarded to the requested destination for further processing.

Any request received by the aggregator 502 is first forwarded to the respective manager modules arranged within the core engine 2004 for checks determination, and other related processing to be carried out. Once that is done, the request is modified by the aggregator 502 and thus converted into new packets (i.e. changing the values of certain fields of the original request packet), and forwarded to the requested destinations. In particular, a new packet includes two object fields: an aggregator header and a body portion. The aggregator header provides information about a specific transaction after being processed by aggregator 502, and includes transaction, client code, session, user, device, and location information. The body portion includes request data to be forwarded to the requested destination for further processing.

The processed request is then forwarded by the aggregator 502 to the requested destination (i.e. associated backend application servers 204) for further related processing. The forwarded request is consequently one of successfully and unsuccessfully processed by the requested destination. In respect of a successful processing, a result returned by the requested destination is then forwarded to the requesting source as a response object, which contains data of the returned result. On the other hand, in respect of an unsuccessful processing, an error response (which includes an error exception code) is received from the requested destination and the aggregator 502 thereafter forwards the error response to the requesting source.

The provisioning manager 504 is arranged to apply access mapping rules which determine if a requesting source is authorised to communicate with a requested destination (i.e. a backend application server 204) as specified in the request. This is determined by comparing the requesting source and the associated requested destination, with respect to the access mapping rules stored in (a database of) the provisioning manager 504. The access mapping rules have a defined granularity of two levels (i.e. based on a destination component and related function), and all the rules are configurable based on requirements. With that, dynamic provisioning of access rights (i.e. permissions) can therefore be granted or revoked at run-time by the system 200.

As for the identity and access manager 506, it is configured to control identity management (i.e. authentication, authorisation and accounting), via a central framework, to facilitate users in accessing the system 200 through the mobile devices 102. Particularly, identities of incoming requests are ascertained for purpose of enabling authentication, authorisation, and accounting by the system 200. Authentication enables determination whether if a request originates from a registered entity (i.e. user/device) or an anonymous entity, in order to grant/deny access. Thus, if the request is indeed from an entity already registered with the system 200, the request is then mapped to a corresponding user and a newly generated session ID. Based on identity credentials, authorisation enables determination if the registered entity is permitted to communicate with a requested destination (i.e. a backend application server 204) specified in the request. Similarly, basing on identity credentials, accounting allows identification and extraction of the information contained in a header portion of the request, which is used for transaction accounting purposes.

Further, the identity and access manager 506 also supports usage of multiple identity repositories, in that use of a master identity repository enables control single sign-on user access to multiple applications whereas use of independent identity repositories instead allows control of user access to individual applications that need to retain control over respective group of users. The identity repositories are either external databases, or databases configured within the system 200, depending on the requirements of an application. In addition, all identity information (which include user-ID, passwords, personal particulars and the like) are configurable to allow dynamic user access provisioning, as it will be apparent to a skilled person that user access rights can be granted or revoked at run-time.

The transaction log manager 508 is configured to log information of all incoming requests received by the aggregator 502, and data of the transactions processed are logged to a central database repository, which is optimally tuned for required speed and performance. Further, all supplementary information (e.g. identity and device profile) associated to each request are to be logged together with any related transaction data. Logging is carried out for request receipt and response submission so that an originator of a request and the results of a transaction are accounted for. It is to be appreciated that a transaction is defined to be the smallest unit of work that is individually tracked within the system 200 for auditing purposes. Additionally, all logged transactions are time-stamped to meet non-repudiation standards, and to allow easy retrieval and consolidation of any logged details. Any transaction is described in two logs, in that a first log (i.e. "request log") is used to record the requests received, while a second log (i.e. "response log") is used to record the responses submitted in reference to the corresponding requests.

Specifically, the request log stores the following fields of information: "Request timestamp", "Request source", "Request destination", "Server ID" (which identifies a backend application server 204), "Thread ID" (which identifies a processing system thread), "Client ID", "Transaction ID" (which groups multiple requests serving a same transaction), "Session ID" (if available), "User ID" (if available), "Device Profile Information" (if available), and "Device Location Information" (if available).

On the other hand, the response log stores the following fields of information: "Response timestamp", "Server ID" (which identifies the hosting application server), "Thread ID" (which identifies the processing thread), "Result code" (indicates a success code or error code), and "Result message" (either as a success message or an error message). It is to be appreciated that a list of result codes is to be pre-loaded and referenced with respect to a comprehensive message mapping table, which is stored on a system database (not shown) accessible by the core engine 2004. Further, the result message is parameterised with a format of "{0}", where the "0" in the format "{0}" is subsequently replaced by the system 200 with a suitable string value. For illustration purpose, an example of the result message coded in the format of "{0}" is "{SYS100}", where "SYS100" indicates "Invalid-User-Login" which is referenced from the message mapping table.

The trace helper 510 is arranged to log system traces/messages, in a trace log that is used to facilitate debugging, performance optimisation, deciphering runtime unknown exceptions and any other non-operational related logging. The trace log includes the following information: "Trace timestamp", "Server ID" (which identifies a backend application server 204), "Thread ID" (which identifies a processing system thread), and "Trace message". The message is parameterised with a format of "{0}", where the system subsequently replaces the "0" in the format "{0}" with a suitable string value. This is also to be understood with reference to the similar afore described in the preceding paragraph.

The configuration helper 512 is then configured to control access to global configuration parameters used by the core engine 2004. It is to be appreciated that the global configuration parameters are pre-loaded and referenced with respect to the message mapping table.

The device profile manager 514 is configured to store a database containing information about the profiles of the mobile devices 102 that have requested services, and thus allows management of those mobile devices 102 in terms of grant of related access rights. On the other hand, the device location manager 516 is then configured to ascertain if a specific mobile device 102 sending out a request is located within the vicinity of a merchant providing the requested service, and if yes, uses the information accordingly to better facilitate provision of the service to a user operating the mobile device 102. That is, the device location manager 516 is able to locate the specific mobile device 102 via the location data, as afore described.

Figure 6:
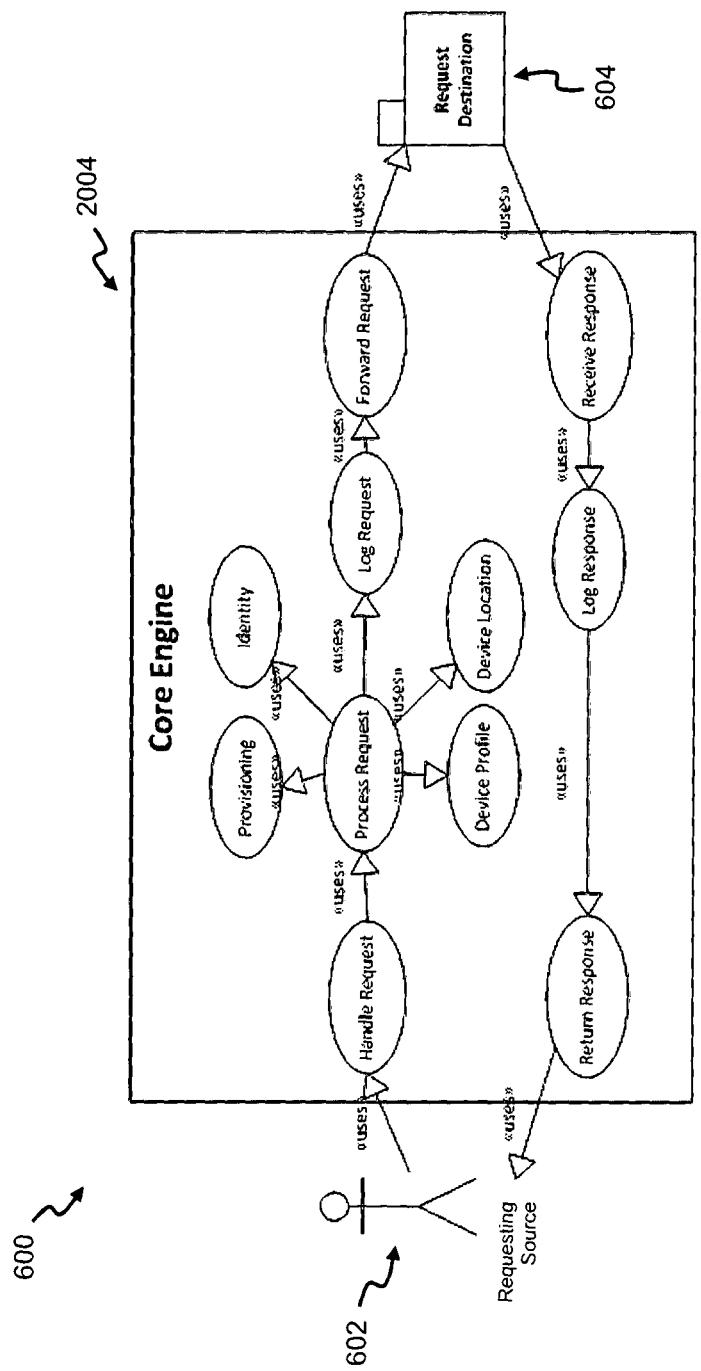
FIG. 6 is a user case diagram in relation to receipt of an original request by the core engine component of FIG. 5.

FIG. 6 depicts a user case diagram 600 in relation to receipt of an original request by the core engine 2004 (via the aggregator 502). The aggregator 502 initially receives a request for a transaction sent by a requesting source 602 (via the communication channel 2002 or solutions domain 2006) to a requested destination 604. The request includes transaction information (i.e. client code, transaction, and session), request header (i.e. information about the requesting source 602, and requested destination 604), and a body portion, as afore described. The request is then orderly processed by respective manager modules in the following sequence: (1). the identity and access manager 506 is triggered to determine the user identity of the request based on a session identifier, if available. If the user identity is determined as valid, identity information of the associated user is then attached to the request header, (2). the device profile manager 514 is then activated to determine a device profile of the mobile device 102 initiating the request, if such device profile information is available. The retrieved profile information is written into the original request header (i.e. modifying the request header), (3). the device location manager 516 is next activated to determine a present location of the mobile device 102, if such location information is available. The retrieved location information is subsequently written into the request header, (4). the transaction log manager 508 is activated to record an associated log for processing the request corresponding to the transaction, and (5). the provisioning manager 504 is finally employed to determine access rights of the requesting source 602 to communicate with the requested destination 604. If there are valid access rights, the request is permitted to proceed. However, if access rights are invalid, an exception is consequently thrown. An error message, which includes an error code corresponding to the exception thrown, generated due to determination of the invalid access rights is then logged by the transaction log manager 508. Subsequently, the aggregator 502 forwards the exception thrown, as an error packet, back to the requesting source 602.

Assuming there are valid access rights, the original request, but with a modified header portion, is forwarded to the requested destination 604 and the aggregator 502 thus waits for a response to be returned by the requested destination 604. If the requested destination 604 is not present, available or a response is not received within a predefined expiry period, an exception is thrown by the aggregator 502. Thereafter, the transaction log manager 508 is activated to log an error message, which includes an error code corresponding to the exception thrown, and the aggregator 502 also forwards the exception thrown, as an error packet, back to the requesting source 602. On the other hand, if the requested destination 604 responds with an exception, the exception is caught by the aggregator 502. Similarly, an error message, in respect of the exception generated, is logged by the transaction log manager 508, and the aggregator 502 forwards the exception thrown, as an error packet, back to the requesting source 602. If the requested destination 604 responds with a success message, the success message is forwarded to the requesting source 602 (as a success packet), and the transaction log manager 508 accordingly logs information corresponding to receipt of the success message received.

Figure 7:
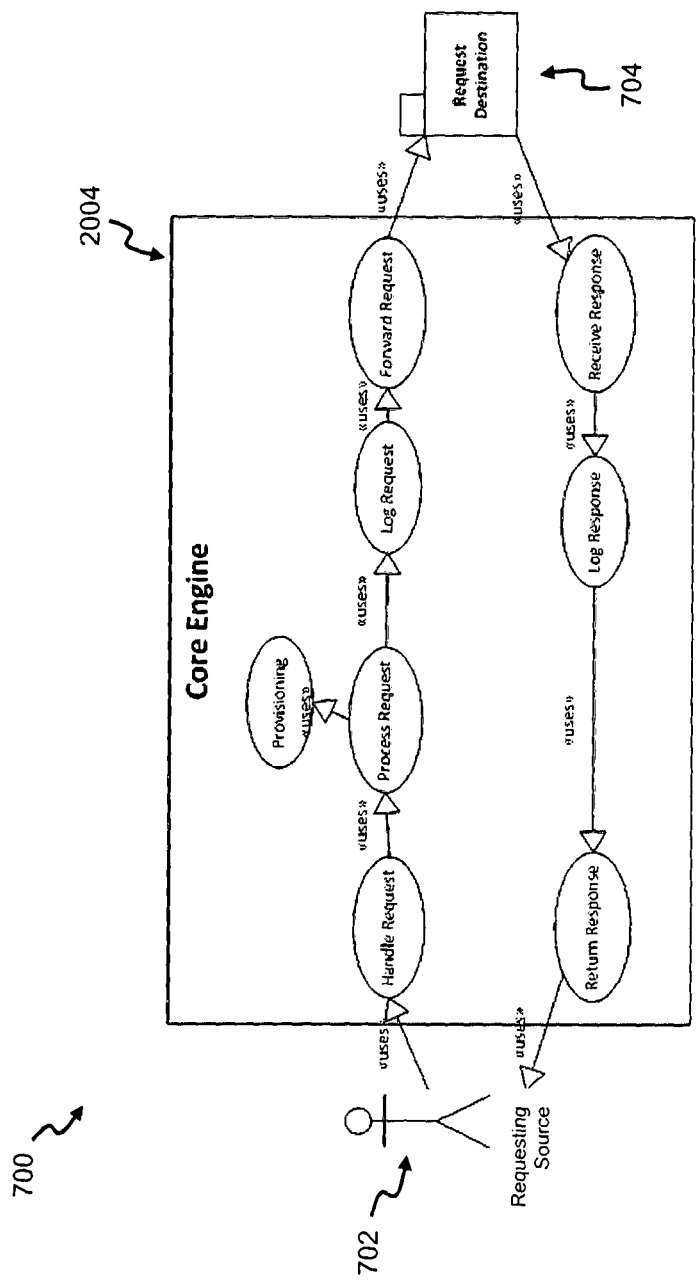
FIG. 7 is a user case diagram in relation to receipt of a follow-up request by the core engine component of FIG. 5.

FIG. 7 depicts a user case diagram 700 in relation to receipt of a follow-up request by the core engine layer 2004 (via the aggregator 502). The aggregator 502 receives a request for a transaction transmitted by a requesting source 702 (via the communication channel 2002 or solutions domain 2006) to a requested destination 704. It is to be understood that the values of the requesting source 702 and requested destination 704 of this follow-up request correspond to the respective values of the requesting source 602 and requested destination 604 of the original request of FIG. 6. The request includes an aggregator header (i.e. transaction, client, session, user, device, and location), a request header (i.e. information about the requesting source 702, and requested destination 704), and body portion, as afore described. In this instance, the request is processed by some of the manager modules in the following sequence: (i) the transaction log manager 508 is activated to record an associated log corresponding processing the request, and (ii) the provisioning manager 504 is triggered to determine access rights of the requesting source 702 to communicate with the requested destination 704. If there are valid access rights, the request is permitted to proceed. However, if invalid access rights are ascertained, an exception is consequently thrown by the aggregator 502. An error message, which includes an error code corresponding to the exception thrown, is then logged by the transaction log manager 508. Subsequently, the aggregator 502 forwards the exception thrown, as an error packet, back to the requesting source 702.

Assuming there are valid access rights, the request, with a modified header portion, is forwarded to the requested destination 704 and the aggregator 502 waits for a response from the requested destination 704. If destination is not available, present or a response is not received with a predefined expiry period, an exception is thrown by the aggregator 502. The transaction log manager 508 is subsequently activated to log an error message, which includes an error code corresponding to the exception thrown, and the aggregator 502 thereafter forwards the exception thrown, as an error packet, back to the requesting source 702. Similarly, if the requested destination 704 responds with an exception, the exception is caught by the aggregator 502. An error message is then logged by the transaction log manager 508, and the aggregator 502 forwards the exception thrown, as an error packet, back to the requesting source 702. On the other hand, if the requested destination 704 responds with a success message, the success message is forwarded to the requesting source 702 (as a success packet), and the transaction log manager 508 accordingly logs information corresponding to receipt of the success message.

Figure 8:
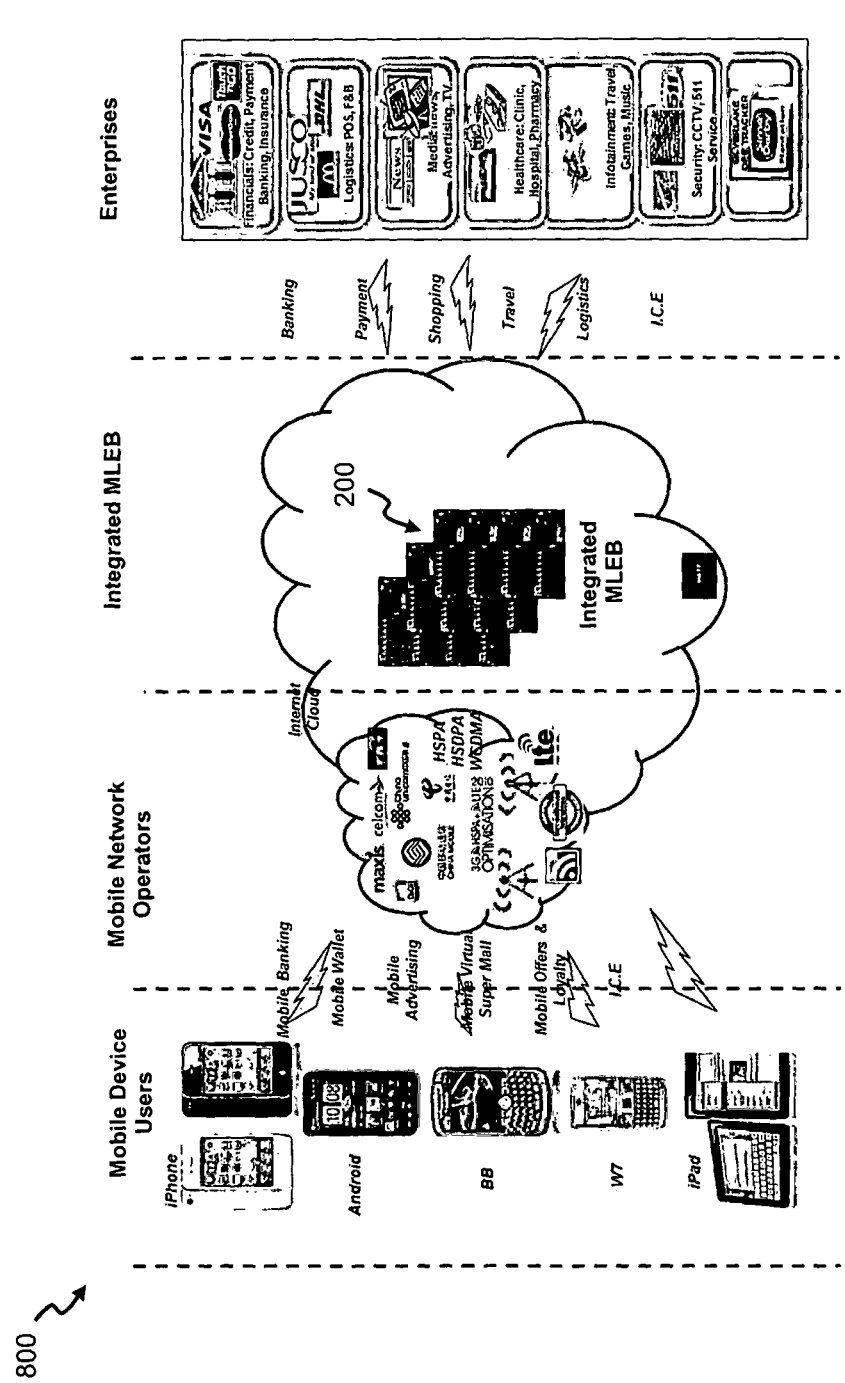
FIG. 8 shows application of the system of FIG. 2 in a mobile internet services value chain.

In using the system 200, complex, lengthy and costly point-to-point implementations typically used to develop conventional middleware systems may be eliminated. Further, in respect of a mobile internet services value chain, the system 200 functions as a common platform that may be utilised by diverse mobile applications that communicate with a similarly diverse range of backend application servers 204. As a result, the pace at which new mobile web and native application services are introduced may beneficially be accelerated, and thus allow more focus instead be directed to development of a business domain desired by a merchant (i.e. service entity). The specific role of the system 200 in the mobile internet services value chain is depicted in FIG. 8, in which the value chain primarily comprises four key players, being mobile device users (who consume mobile web and native application services), mobile network operators (who deliver the mobile communication services), enterprises (which provide mobile web and native application services), and the system 200 (which bridges the mobile device users to the enterprises by integrating and aggregating the mobile communication services and application services). In other words, the system 200 is a unified gateway and services enabler that will advantageously simplify and accelerate introduction of integrated mobile web and native application services to mobile consumers.

The described embodiment(s) should not however be construed as limitative. For example, it is to be appreciated that the system 200 may also be used by wired communication systems (e.g. desktop-based personal computers), and not just limited to the mobile devices 102, to communicate with the backend application servers 204.

While the invention has been illustrated and described in detail in the drawings and foregoing description, such illustration and description are to be considered illustrative or exemplary, and not restrictive; the invention is not limited to the disclosed embodiments. Other variations to the disclosed embodiments can be understood and effected by those skilled in the art in practising the claimed invention.

Having described the invention, the following is claimed:

1. A method of processing requests for different digital services hosted by respective service entities, the method comprising:
providing a processor including an aggregator module and an authentication module, a communication device connected to the processor;
receiving a request packet from the communication device, the request packet including a source identifier and a destination identifier;
determining, based on the destination identifier, which one of the different digital services the communication device is requesting a service from;
authenticating the request packet based on the source identifier to determine an access permission of the communication device for accessing the one of the different digital services the communication device is requesting a service from;

wherein authenticating the request packet includes comparing the source identifier and the destination identifier with access mapping rules having granularity levels based on a destination component and a related function, and wherein the access mapping rules are configurable to allow dynamic user access;

when the access permission is granted, modifying the request packet and forwarding the modified request packet based on the destination identifier to the one of the different digital services for processing; wherein modifying the request packet includes mapping the request packet to a corresponding client code and a newly generated session-ID; the client code being associated to the session-ID, which is timed to expire after a predetermined period;

when the one of the different digital services is not available, present or a response is not received within the predetermined period, sending an error packet back to the communication device; and receiving from a trace helper a trace log to facilitate debugging and decipher runtime unknown exceptions including a trace timestamp, server identification, thread identification, and trace message.

2. The method of claim 1, wherein the communication device is a mobile communication device.

3. The method of claim 1, wherein the communication device is a wired communication device.

4. The method of claim 1 further comprises:
generating an error code, when the access permission is not granted; and
forwarding an error packet, which includes the error code, to the communication device.

5. The method of claim 1 further comprises retrieving device profile information from the communication device.

6. The method of claim 1 further comprises retrieving information corresponding to a location of the communication device from the communication device.

7. The method of claim 1 further comprises logging information associated with processing of the request packet.

8. The method of claim 1 further comprises:
receiving a response packet from a system associated with the destination identifier, in response to the forwarded request packet;
processing the response packet to extract associated data information; and
forwarding the extracted data information to the communication device,
wherein processing the response packet includes performing corresponding steps for analyzing the extracted data information.

9. The method of claim 8, wherein the corresponding steps are selected from a group consisting of logging an error message and sending an associated error packet when the extracted data information includes the error message, and logging a success message and sending an associated success packet when the extracted data information includes the success message.

10. The method of claim 1 wherein the service entities provide the different digital services selecting from a group comprising finance, logistic, retail, media, healthcare, infotainment, security, education, and tourism.

11. A processor for processing requests for different digital services hosted by respective service entities, the processor comprising:

an aggregator module for receiving a request packet from a communication device, the request packet including a source identifier and a destination identifier, and for determining, based on the destination identifier, which one of the different digital services the communication device is requesting a service from; and an authentication module for authenticating the request packet based on the source identifier to determine an access permission of the communication device for accessing the one of the different digital services the communication device is requesting a service from, wherein the aggregator module includes a provisioning sub module arranged to compare the source identifier and the destination identifier with access mapping rules having granularity levels based on a destination component and a related function, and wherein the access mapping rules are configurable to allow dynamic user access; and wherein when the access permission is granted, the aggregator module modifies the request packet and forwards the modified request packet based on the destination identifier to the one of the different digital services for processing; and wherein modifying the request packet includes mapping the request packet to a corresponding client code and a newly generated session-ID; the client code associated to the session-ID which is timed to expire after a predetermined period; and wherein when the one of the different digital services is not available, present or a response is not received within the predetermined period, the aggregator module sends an error packet back to the communication device; and a trace helper for providing a trace log to facilitate debugging and decipher runtime unknown exceptions including a trace timestamp, server identification, thread identification, and trace message.

12. The processor of claim 11 wherein the aggregator module includes an identity and access sub module configured to perform identity management of the communication device,
wherein identity management includes providing authentication, authorisation and accounting.

13. The processor of claim 11 wherein the aggregator module includes a transaction logging sub module configured to log information relating to the request packet received by the aggregator module.

14. A middleware system for enabling digital transactions between communication devices and server systems, the middleware system comprising:

a processor for processing requests for different digital services hosted by respective service entities, the processor comprising:

an aggregator module for receiving a request packet from a communication device, the request packet including a source identifier and a destination identifier, and for determining, based on the destination identifier, which one of the different digital services the communication device is requesting a service from; and an authentication module for authenticating the request packet based on the source identifier to determine an access permission of the communication device for accessing the one of the different digital services, wherein the aggregator module includes a provisioning sub module arranged to compare the source identifier and the destination identifier with access mapping rules having granularity levels based on a destination component and a related function, and wherein the access mapping rules are configurable to allow dynamic user access; and wherein when the access permission is granted, the aggregator module modifies the request packet and forwards the modified request packet based on the destination identifier to the one of the different digital services for processing; and wherein modifying the request packet includes mapping the request packet to a corresponding client code and a newly generated session-ID; the client code associated to the session-ID which is timed to expire after a predetermined period; and wherein when the one of the different digital services is not available, present or a response is not received within the predetermined period, the aggregator module sends an error packet back to the communication device; and a trace helper for providing a trace log to facilitate debugging and decipher runtime unknown exceptions including a trace timestamp, server identification, thread identification, and trace message.

\* \* \* \* \*